United States Patent
Lyle et al.

(10) Patent No.: US 8,949,445 B2
(45) Date of Patent: Feb. 3, 2015

(54) OPTIMIZING ELECTRONIC COMMUNICATION CHANNELS

(75) Inventors: Ruthie D. Lyle, Durham, NC (US); Patrick Joseph O'Sullivan, Ballsbridge (IE); Fred Raguillat, Meath (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 13/355,783

(22) Filed: Jan. 23, 2012

(65) Prior Publication Data

US 2013/0191546 A1 Jul. 25, 2013

(51) Int. Cl.
  G06F 15/16 (2006.01)
  H04L 29/06 (2006.01)
(52) U.S. Cl.
  CPC ............... H04L 29/06326 (2013.01)
  USPC ............. 709/228; 709/223; 709/227
(58) Field of Classification Search
  None
  See application file for complete search history.

(56) References Cited

U.S. PATENT DOCUMENTS

| | | | |
|---|---|---|---|
| 6,839,417 B2 | 1/2005 | Weisman et al. | |
| 7,000,019 B2 * | 2/2006 | Low et al. | 709/227 |
| 7,353,252 B1 | 4/2008 | Yang et al. | |
| 7,706,401 B2 * | 4/2010 | Bae et al. | 370/466 |
| 2003/0058806 A1 | 3/2003 | Meyerson et al. | |
| 2007/0203980 A1 | 8/2007 | Andersen | |
| 2010/0077087 A1 | 3/2010 | Roy et al. | |
| 2011/0110360 A1 | 5/2011 | Fenwick et al. | |
| 2013/0142084 A1 * | 6/2013 | Tokunaga et al. | 370/259 |

OTHER PUBLICATIONS

Seppanen, Prospects of Peer-to-Peer SIP for Mobile Operators, Master Thesis, http://lib.tkk.fi/Dipl/2007/urn010142.pdf, Jul. 25, 2007, pp. 1-75.
J. Rosenberg et al., "SIP: Session Initiation Protocol," http://www.ietf.org/rfc/rfc261.txt, Jun. 2002, pp. 1-252.
A.B. Roach, "Session Initiation Protocol (SIP)—Specific Event Notification," https://tools.ietf.org/tools/rfcmarkup/rfcmarkup.cgi?rfc=3265, Jun. 2002, pp. 1-39.
A. Niemi, Ed, "Session Initiation Protocol (SIP) Extension for Event State Publication," ftp://ftp.rfc-editor.org/in-notes/rfc3903.txt, Oct. 2004, pp. 1-30.
Anders Kristensen, "SIP Servlet API," Dynamicsoft, Inc., Feb. 2003, 1-108.

* cited by examiner

*Primary Examiner* — Jeffrey R Swearingen
(74) *Attorney, Agent, or Firm* — Holland & Knight LLP; Brian J. Colandreo, Esq.; Jeffrey T. Placker, Esq.

(57) ABSTRACT

A method, computer program product, and system for electronic communication is described. A first unified telephony session is selected. A first arbitrator associated with the first session is selected. A first set of participants associated with the first session is selected. The first arbitrator is directed to act as a proxy connection for a first channel associated with the first set of participants.

15 Claims, 6 Drawing Sheets

OPTIMIZING ELECTRONIC COMMUNICATION CHANNELS

TECHNICAL FIELD

This disclosure relates to electronic communication.

BACKGROUND

Organizations may often find it useful to implement communication among users through electronic means, particularly through the use of electronic communication sessions like unified telephony sessions. Certain aspects of electronic communication sessions may lead to server overload or channel capacity issues, which may detrimentally affect the quality of a particular session.

BRIEF SUMMARY OF THE DISCLOSURE

According to a first aspect of the disclosure, a computer-implemented method includes selecting a first unified telephony session. The method further includes selecting a first arbitrator associated with the first session. The method further includes selecting a first set of participants associated with the first session, and directing the first arbitrator to act as a proxy connection for a first channel associated with the first set of participants.

One or more of the following features may be included. The method may include selecting the first arbitrator based upon, at least in part, session importance. The method may include selecting at least one of the current set of arbitrators and the first arbitrator based upon, at least in part, at least one of: Lightweight Directory Access Protocol information, state table information, network proximity information, intelligent mining patterns, an input from a first administrator, a self-learning algorithm related to the first session, an order of connection related to the first session, an unavailability of a second arbitrator, a connection strength or a quality of service, and an overloading of a second channel.

The method may further include selecting at least one of the first set of participants and the first channel based upon, at least in part, at least one of: Lightweight Directory Access Protocol information, state table information, network proximity information, intelligent mining patterns, an input from a first administrator, a self-learning algorithm related to the first session, an order of connection related to the first session, an unavailability of a second arbitrator, a connection strength or a quality of service, and an overloading of a second channel. Acting as a proxy connection may include negotiating information relating to the first session directly with a member of the first set of participants.

The method may further include determining a success metric associated with a first strategy. The first strategy may be associated with at least one of selecting the first session, selecting the first arbitrator, selecting the first set of participants, and directing the first arbitrator to act as a proxy connection. The method may include determining a second strategy based upon, at least in part, the success metric. The method may include selecting a second unified telephony session associated with a second unified telephony server. The method may also include selecting a second arbitrator associated with the second session. The method may further include selecting a second set of participants associated with the second session. The method may also include directing the second arbitrator to act as a proxy connection for a second channel associated with the second set of participants. At least one of selecting the second session, selecting the second arbitrator, selecting the second set of participants, and directing the second arbitrator to act as a proxy connection may be based upon, at least in part, the second strategy.

Selecting at least one of the first arbitrator and the first set of participants may occur prior to the start of the first session. Selecting at least one of the first arbitrator and the first set of participants may occur during the first session in near real-time. The self-learning algorithm may be implemented based upon, at least in part, detection of a system configuration.

According to another aspect of the disclosure, a computer program product resides on a computer readable storage medium having a plurality of instructions stored on it. When executed by a processor, the instructions cause the processor to perform operations including selecting a first unified telephony session. The operations further include selecting a first arbitrator associated with the first session. The operations further include selecting a first set of participants associated with the first session, and directing the first arbitrator to act as a proxy connection for a first channel associated with at least one member of the first set of participants.

One or more of the following features may be included. The operations may include selecting the first session based upon, at least in part, a session importance. The operations may include selecting at least one of the first arbitrator, the first set of participants, and the first channel based upon, at least in part, at least one of: Lightweight Directory Access Protocol information, state table information, network proximity information, intelligent mining patterns, an input from an administrator, a self-learning algorithm related to the first session, an order of connection related to the first session, an unavailability of a second arbitrator, a connection strength or a quality of service, and an overloading of a second channel.

Acting as a proxy connection may include negotiating information relating to the first session directly with a member of the first set of participants. The operations may further include determining a success metric associated with a first strategy. The first strategy may be associated with at least one of selecting the first session, selecting the first arbitrator, selecting the first set of participants, and directing the first arbitrator to act as a proxy connection. The operations may also include determining a second strategy based upon, at least in part, the success metric. The operations may further include selecting a second unified telephony session associated with a second unified telephony server. The operations may further include selecting a second arbitrator associated with the second session. The operations may further include selecting a second set of participants associated with the second session. The operations may further include directing the second arbitrator to act as a proxy connection for a second channel associated with the second set of participants. At least one of selecting the second session, selecting the second arbitrator, selecting the second set of participants, and directing the second arbitrator to act as a proxy connection may be based upon, at least in part, the second strategy.

Selecting at least one of the first arbitrator and the first set of participants may occur prior to the start of the first session. Selecting at least one of the first arbitrator and the first set of participants may occur during the first session in near real-time. The self-learning algorithm may be implemented based upon, at least in part, detection of a system configuration.

According to another aspect of the disclosure, a computing system includes at least one processor and at least one memory architecture coupled with the at least one processor. The computing system also includes a first software module executable by the at least one processor and the at least one memory architecture, wherein the first software module is configured to select first unified telephony session. Further, the computing system includes a second software module which is configured to select a first arbitrator associated with the first session. The computing system also includes a third software module which is configured to select a first set of participants associated with the electronic communication session. The computing system further includes a fourth software module which is configured to configured to direct the first arbitrator to act as a proxy connection for a first channel associated with the first set of participants.

One or more of the following features may be included. The computer system may include a fifth software module executable by the at least one processor and the at least one memory architecture, wherein the fifth software module may be configured to select the first session based upon, at least in part, a session importance. The system may include a sixth software module executable by the at least one processor and the at least one memory architecture, wherein the sixth software module may be configured to select at least one of the first arbitrator, the first set of participants, and the first channel based upon, at least in part, at least one of: Lightweight Directory Access Protocol information, state table information, network proximity information, intelligent mining patterns, an input from an administrator, a self-learning algorithm related to the first session, an order of connection related to the first session, an unavailability of a second arbitrator, a connection strength or a quality of service, and an overloading of a second channel.

Acting as a proxy connection may include negotiating session information relating to the first session directly with a member of the first set of participants. The computer system may include a seventh software module executable by the at least one processor and the at least one memory architecture, wherein the seventh software module is configured to determine a success metric associated with a first strategy, wherein the first strategy is associated with at least one of selecting the first session, selecting the first arbitrator, selecting the first set of participants, and directing the first arbitrator to act as a proxy connection. The computer system may include an eighth software module executable by the at least one processor and the at least one memory architecture, wherein the eighth software module is configured to determine a second strategy based upon, at least in part, the success metric. The computer system may include a ninth software module executable by the at least one processor and the at least one memory architecture, wherein the ninth software module is configured to select a second unified telephony session. The computer system may include a tenth software module executable by the at least one processor and the at least one memory architecture, wherein the tenth software module is configured to select a second arbitrator associated with the second session. The computer system may include an eleventh software module executable by the at least one processor and the at least one memory architecture, wherein the eleventh software module is configured to select a second set of participants associated with the second session. The computer system may include a twelfth software module executable by the at least one processor and the at least one memory architecture, wherein the twelfth software module is configured to direct the second arbitrator to act as a proxy connection for a second channel associated with the second set of participants. At least one of selecting a second session, selecting a second arbitrator, selecting a second set of participants, and causing the second arbitrator to act as a proxy connection may be based upon, at least in part, the second strategy.

Selecting at least one of the first arbitrator and the first set of participants may occur during the first session in near real-time. The self-learning algorithm may be implemented based upon, at least in part, detection of a system configuration.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
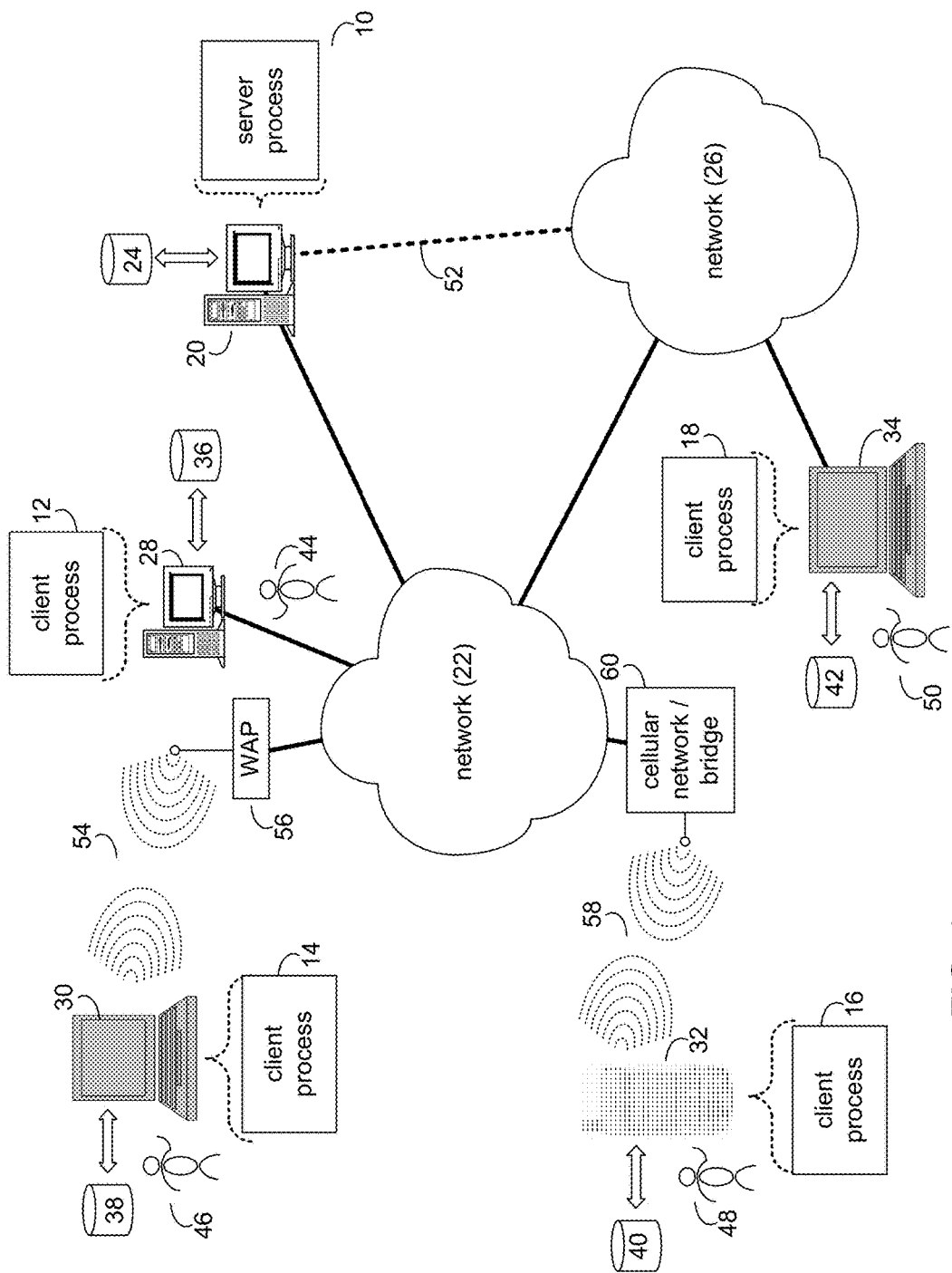
FIG. 1 is a diagrammatic view of a proxy assignment process coupled to a distributed computing network.

Organizations and individuals may often communicate with each other through electronic communication sessions. These may include, for example, audio or video communication sessions. These may further include, for example, text-enabled communication sessions, with or without audio or video capabilities.

Electronic communication sessions are typically implemented through the use of servers, which manage a variety of connections (or channels) associated with groups or individuals participating in the communication sessions. One such server may be associated with one or more communication sessions and multiple servers may be used in various combinations and configurations. During electronic communication sessions situations may arise in which one or more servers approaches or reaches a saturation condition. (This may be otherwise referred to as an overload or over-capacity condition.) For example, the number of channels required for a variety of contemporaneous communication sessions may exceed the number of channels an associated server (or servers) is capable of managing. The bandwidth required for various channels may also contribute to reaching an saturation condition, based on bandwidth limitations associated with a server. Traditionally, one method of addressing saturation conditions may include assigning one or more communication sessions to a different server, or providing additional server capacity through the introduction of new servers or the upgrading of existing server capacity. A different solution may include assigning various channels associated with a communication session to a proxy connection, thereby decreasing the number of channels directly managed by the server.

One type of communication session is known as unified telephony (UT). Conventional UT servers may typically be deployed as part of a UT system and multiple servers may be implemented using both vertical and horizontal scaling. A UT server typically may provide audio and video capabilities to users that are configured on the server, permitting voice and video conferences across a plurality of users. As an example, Lotus Sametime® Unified Telephony provides unified communications middleware which integrates telephony across multivendor Public Branch Exchange (PBS) systems and provides a unified end user experience, including integrated softphones, phone and IM presence awareness, and call management and control across multiple communications systems. UT technology may employ industry standard protocols such as Session Initiation Protocol (SIP) and other protocols defined by the Internet Engineering Task Force (IETF).

UT sessions may be particularly suited for assignment of various channels associated with the sessions to proxy connections. This is due to the nature of UT communication, in which it may be expected that typically only one or two users may be actively participating in a UT session (e.g., speaking or texting) at any given time. As such, in response to (or anticipation of) a server saturation condition, a potentially large number of channels associated with a UT session may be assigned to one or more proxy connections in order to mitigate (or avoid) the server saturation condition. In other words, the nature of UT communication may allow for particularly aggressive use of the disclosed process. Specific examples in the discussion contained herein may refer exclusively to UT sessions, however, it will be understood that such discussion may be applicable to a variety of electronic communication session types.

Figure 2:
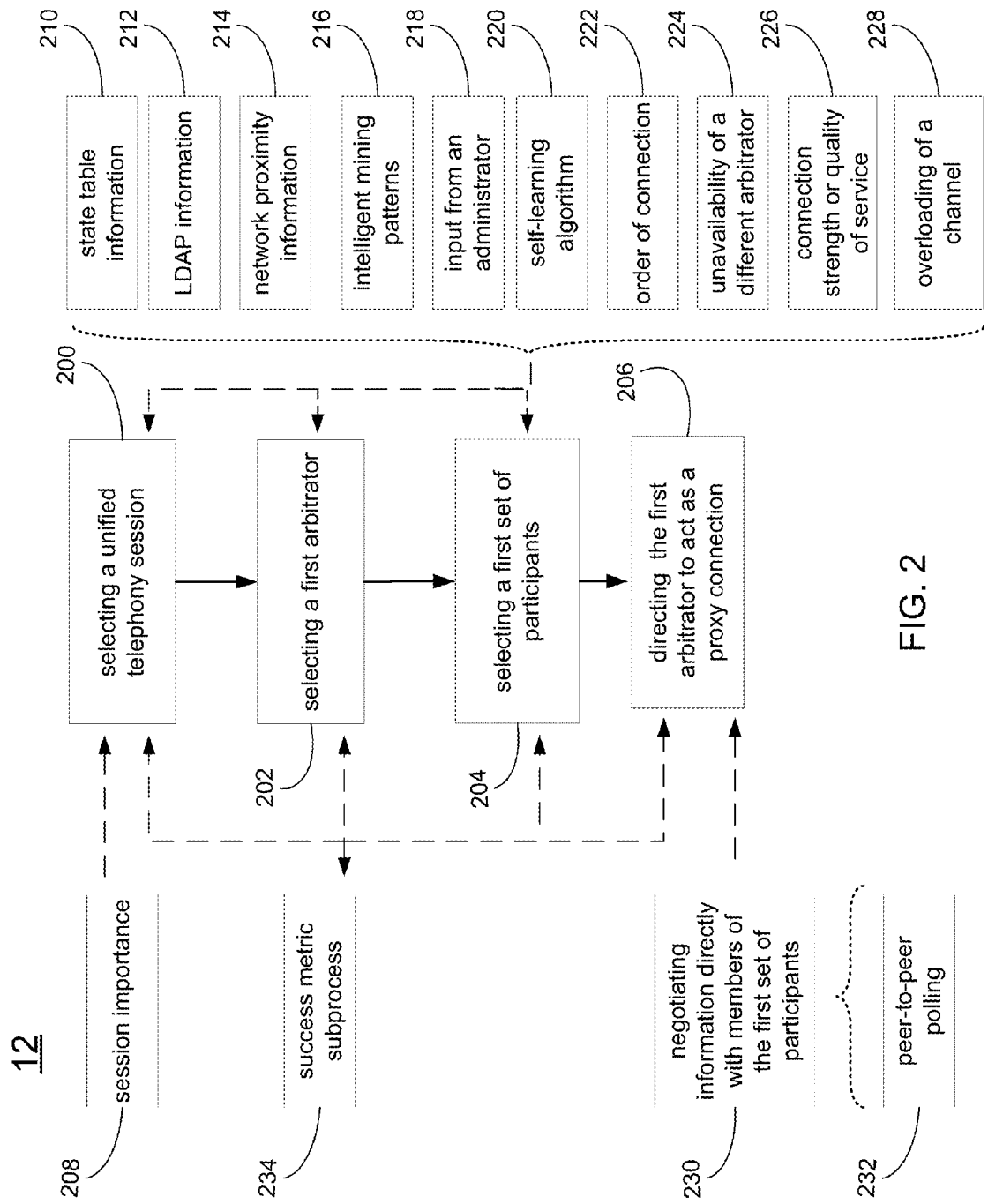
FIG. 2 is a flowchart view of a proxy assignment process.
Figure 3:
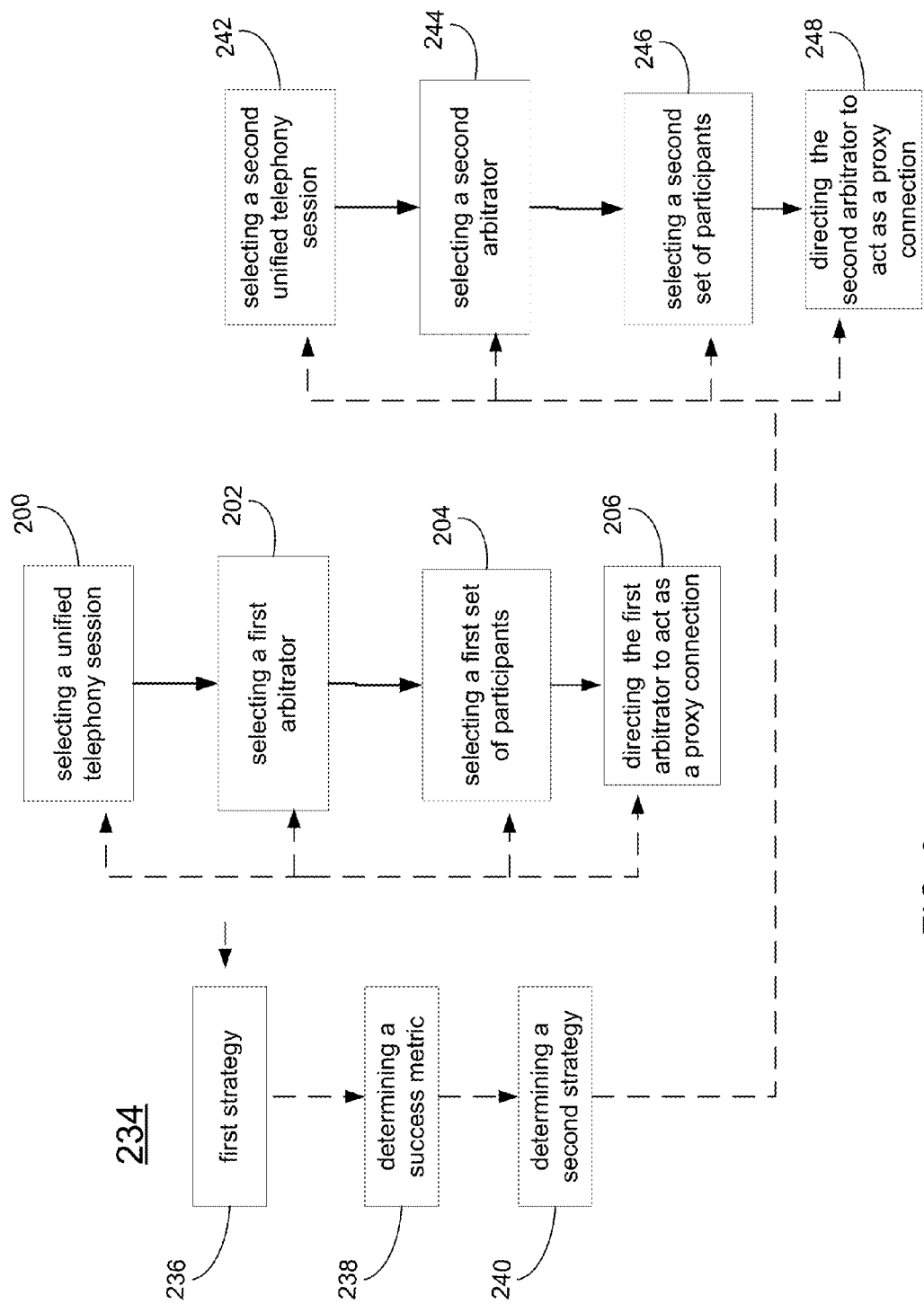
FIG. 3 is a flowchart view of a detail of a proxy assignment process.

Referring to FIGS. 1, 2 & 3, there is shown a proxy assignment process (PAP), for example process 12. As will be discussed further below, process 12 may include selecting 200 a unified telephony session. Selecting 200 a unified telephony session may be based upon, at least in part, session importance 208. Process 12 may also include selecting 202 a first arbitrator associated with the selected session. Selecting 202 an arbitrator may be based upon, at least in part, at least one of: Lightweight Directory Access Protocol information 212, state table information 210, network proximity information 214, intelligent mining patterns 216, an input from an administrator 218, a self-learning algorithm related to the electronic communication session 220, an order of connection related to the electronic communication session 222, an unavailability of a second arbitrator 224, a connection strength or a quality of service 226, and an overloading of a channel 228.

Process 12 may also include selecting 204 a first set of participants associated with the electronic communication. Selecting 204 a first set of participants may be based upon, at least in part, at least one of: Lightweight Directory Access Protocol information 212, state table information 210, network proximity information 214, intelligent mining patterns 216, an input from an administrator 218, a self-learning algorithm related to the electronic communication session 220, an order of connection related to the electronic communication session 222, an unavailability of a second arbitrator 224, a connection strength or a quality of service 226, and an overloading of a channel 228.

Process 12 may also include directing 206 the first arbitrator to act as a proxy connection for a channel associated with at least one member of the first set of participants. Directing 206 the first arbitrator to act as a proxy may include negotiating 230 information directly with members of the first set of participants. Selecting 200 the first arbitrator may occur prior to the start of the electronic communication session or during the electronic communication session in near real-time. In this context, near real-time indicates occurrence of a process or process step such that a participant in a unified telephony session does not experience noticeable call disruption between the occurrence of a triggering event and the completion of the process or process step. The self-learning algorithm 220 may be implemented in response to detection of a system configuration.

Process 12 may further include use of success metric subprocess 234. Subprocess 234 may include determining 238 a success metric associated with first strategy 236. First strategy 236 may be associated with at least one of selecting 200 a unified telephony session, selecting 202 a first arbitrator, selecting 204 a first set of participants, and directing 204 the first arbitrator to act as a proxy connection. As such, first strategy 236 may also be associated with at least one of Lightweight Directory Access Protocol information 212, state table information 210, network proximity information 214, intelligent mining patterns 216, an input from an administrator 218, a self-learning algorithm 220 related to the UT session, an order of connection 222 related to the UT session, an unavailability of a second arbitrator 224, a connection strength or a quality of service 226, and an overloading of a channel 228. Subprocess 234 may further include determining 240 a second strategy based upon, at least in part, the success metric. It will be recognized that the second strategy may be determined to be similar to, identical to, or entirely distinct from first strategy 236. At least one of selecting 242 a second unified telephony session, selecting 244 a second arbitrator, selecting 246 a second set of participants, and directing 248 the second arbitrator to act as a proxy connection for a second channel associated with the second set of participants may be based upon, at least in part, the determined second strategy.

A PAP may be a server-side process (e.g., server process 10), a client-side process (e.g., client process 12, client process 14, client process 16, or client process 18), or a hybrid server-side/client-side process (e.g., the combination of server process 10 and one or more of client processes 12, 14, 16, 18).

Server process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client processes 12, 14, 16, 18 may reside on and may be executed by client electronic devices 28, 30, 32, and/or 34

(respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CEO, Red Hat® Linux®, or a custom operating system.

The instruction sets and subroutines of client processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

One or more of client processes 12, 14, 16, 18 and server-side process 10 may interface with each other (e.g., via network 22 and/or network 26).

Users 44, 46, 48, 50 may access server process 10 directly through the device on which the client process (e.g., client-side processes 12, 14, 16, 18) is executed, namely client electronic devices 28, 30, 32, 34, for example. Users 44, 46, 48, 50 may access server process 10 directly through network 22 and/or through secondary network 26. Further, server computer 20 (i.e., the computer that executes server process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

A Proxy Assignment Process (PAP)

For the following discussion, client PAP 12 will be described for illustrative purposes. It should be noted that client process 12 may be incorporated into server process 10 and may be executed within one or more applications that allow for communication with client process 12. However, this is not intended to be a limitation of this disclosure, as other configurations are possible (e.g., stand-alone client processes and/or stand-alone server processes.) For example, some implementations may include one or more of client processes 14, 16, 18 in place of or in addition to client process 12.

Figure 4:
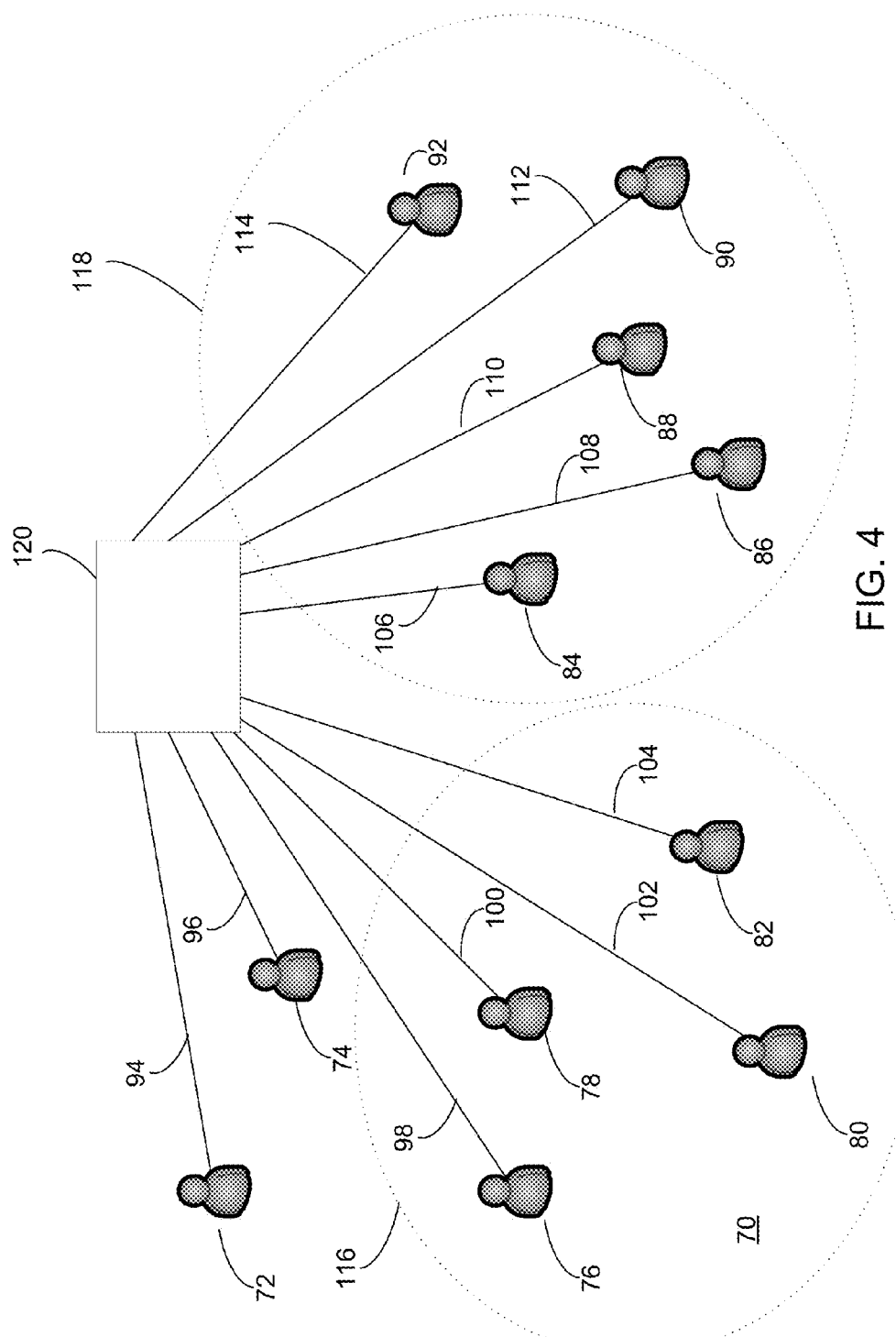
FIG. 4 is a first diagrammatic view of an implementation of a proxy assignment process.

Various electronic communication between individuals or groups may sometimes occur by way of multiple channels between and among participants and one or more central servers. As used herein, channel refers to an electronic connection between endpoints capable of transmitting data. Referring now also to FIG. 4, in traditional configurations for electronic communication sessions, each node in the communication session network, which may be an individual (or group), e.g., individual 82, employs a single channel during an electronic communication session, e.g., channel 104, from individual 82 to server 120. As a consequence of this configuration, it can be seen that a channel to the server exists for each individual or group, e.g., group 92 or individual 90. (It will be understood that these and like depictions in the figures and corresponding description in the disclosure may be considered to include, variously, individuals such as users, groups including multiple individuals, such as business organizations or associations, in each case employing one or more computing devices. For example, feature 72, in FIG. 4 may indicate a group employing a laptop computer or an individual employing a smartphone device.)

As is apparent from this description including the diagrammatic views of FIG. 3 and FIG. 4, there may be a one-to-one or near one-to-one relationship between the number of transmission nodes (e.g., individuals 72 and 74, employing one or more computing devices) and the number channels between the nodes and the server (or servers). As such, a server that is managing electronic communication between and among 100,000 individuals or groups may need to manage 100,000 channels. This can be problematic, for example, if the number of channels needed (or the associated bandwidth) causes a server to approach or exceed its capacity. This may, accordingly, result in a saturation condition, resulting, for example, in server failure or the undesired or unexpected termination of certain channels. This may cause undesired disruption of one or more electronic communication sessions.

Figure 5:
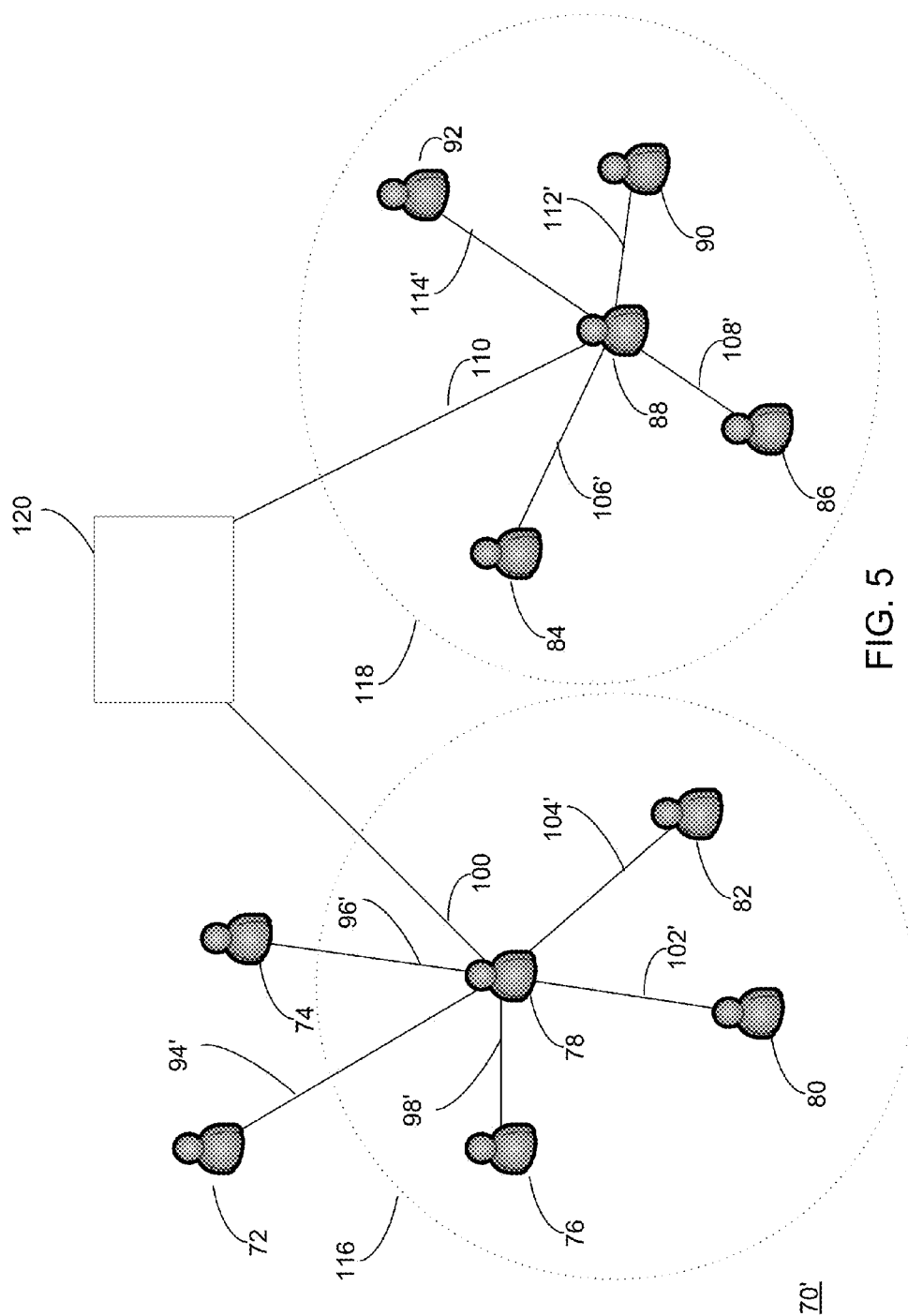
FIG. 5 is a second diagrammatic view of an implementation of a proxy assignment process.

A traditional approach has been to introduce additional or different servers in order to address the capacity issue. As an alternative, however, it may be desirable to select certain individuals (or groups) as arbitrators and direct the arbitrators to act as proxy connections for other individuals. In this way, the number of channels the server is required to manage may be dramatically decreased. For example, an electronic communication session may be represented by the depiction of FIG. 4. Eleven participants (e.g., user 82, group 92, etc.) may be associated with the session, requiring eleven channels between the participants and server 120 in a traditional configuration. Referring now also to FIG. 5 it can be seen that through an implementation of process 12 on the electronic communication session user 78 has maintained her channel 100 with the server. Channels 104, 102, 98, and 94, however, between server 120 and users 82, 80, 76, 74 and 72, respectively, have been replaced with channels 104', 102', 98', and 94' between user 78 and users 82, 80, 76, 74 and 72, respectively. (An equivalent arrangement may also be seen in FIG. 4 in which user 88 is acting as a proxy connection.) This amounts locally, for example, to elimination of five previously-necessary channels to the server (along with the related reduction in server load).

Process 12 may also be implemented with other configurations of nodes (i.e., users, individuals, groups, etc.), servers and channels, and may be run iteratively in order to create multiple levels or other complex hierarchies of proxy connections and arbitrators. It will be understood, that because channel bandwidth for transmission of information may be limited by hardware or other considerations with the result that the number of other users a particular user may act as proxy for may also be limited. This number of users may vary depending on the type of network(s) or communication equipment employed or the type of electronic communication utilized. Participants acting as proxies in voice-only or voice-and-text communication, for example, may be permitted to support more channels than participants acting as proxies in video-enabled communication. Similarly, the dynamics of a particular electronic communication session may influence the possible number of participants supported by a given proxy channel. For example, in a UT session it is often expected that only one or two participants will speak simultaneously. The lower bandwidth associated with this pattern thus may permit a high number of participants per arbitrator. However, a unexpected spike in simultaneous participation rate, as in a mass argument or spontaneous cheer may sometimes reduce the actual number of participants per arbitrator.

The expected nature of UT sessions may allow a particularly aggressive implementation of process 12. For example, a single UT session with 1000 participants may require 1000 channels to the associated UT server under a traditional call configuration. Process 12, however, may result in 10 arbitrators being assigned to 99 participants each, thereby reducing the number of necessary channels to the server from 1000 to 10, a 99% reduction. It will be recognized however, that such aggressive implementation of process 12 may not be necessary or desirable for every UT session. For example, as is further elaborated in this disclosure, process 12 may be implemented with respect only to individual (or small numbers of) participants as a server approaches (or reaches) a saturation condition, and only as necessary to prevent (or mitigate) the saturation condition. In this way, any detrimental performance that may result from assignment of participants to proxy connections may be minimized while preventing other undesirable effects associated with server overload.

Process 12 may include selecting 200 a UT session. In order to replace one or more channels to server 120 with a proxy channel, it is first necessary to determine a particular session to which process 12 will be applied. A session, in this context, may be delineated by a set of participants in a single UT session, i.e., a set of participants that are each able to communicate with each other at a given time by virtue of the UT connections between them. For example, a UT conference call involving 12 participants in Atlanta, Ga., 14 participants in Seoul, South Korea, and 9 participants in Madrid, Spain may be considered a single UT session. A separate UT conference call involving 27 participants distributed throughout South America, and which does not permit cross-participation with the first conference call, may be considered a distinct UT session. It will be understood that, as used herein, UT session may refer to any variety of UT implementations, including voice-only, and video- and text-enabled sessions.

Implementation of process 12 may prevent (or mitigate) a saturation condition and therefore prevent (or mitigate) various associated session quality issues. However, use of one or more proxy connections may sometimes result in other quality of service issues. For example, in a video-enabled UT session, the use of one or more proxy connections through process 12 may result in the inability to reliably deliver video information to all participants at all times. (One solution to this particular issue may be, for example, to temporarily "freeze" video transmission upon occurrence of a negative quality trigger, thereby ensuring continuous delivery of at least audio information.) Because of this and other potential session quality issues that may be associated with certain implementations of process 12, it may be may desirable to select a session via process 12 (i.e., a session that will include proxy connections and therefore may be subject to associated session quality issues) based upon session importance. As such, selecting a UT session may be based upon, at least in part, session importance.

When selecting a unified telephony system is based upon session importance, assignment of participants to proxy connections may be performed on sessions with higher importance first, with participants in sessions of lower importance being preferably not assigned to proxy connections unless otherwise necessary. Session importance may refer to a variety of metrics indicating a ranking of sessions that are associated with a particular UT server (or servers). Importance may be determined based upon a variety of criteria. For example, importance may be determined based on the number of participants associated with a particular UT session. Depending on specific circumstances, a session with, for example, the largest number of participants (as compared, for example, to all other contemporaneous sessions) may be determined to have the highest importance, because assignment of participants of this large call to proxy connections may have disproportionate effects on the saturation of the server.

Alternatively, session importance may be determined based upon the expected duration of a UT session, the order in which various UT sessions were initiated on a UT server, the identity of participants associated with a given UT session (as determined, for example, by reference to Lightweight Directory Access Protocol information or state table information), historical ranking of sessions, or various other criteria. For example, sessions with high ranking executives among the participants may be determined to have low importance (i.e., not be particularly suited for a proxy assignment process). Alternatively, importance may be determined on a first-come-first-served basis, with the latest connected session having the highest importance, or importance may be determined based upon the average network proximity of call participants. For example, a call in which a large number of participants enjoy, on average, close network proximity may be particularly suited for proxy connection assignment and therefore be assigned high importance. As another example, if it is determined that a particular UT session is likely to end in the next 5 minutes and multiple participants to that session have already disconnected, that session may be ranked with high importance and preferably chosen for assignment of proxy connections. The likely duration of an existing UT session may be determined from a variety of sources, including historical records of similar sessions (e.g., sessions with similar participant rosters), or calendar entries or invitations (e.g., calendar entries indicating that a call is scheduled to last only from 10 AM to 11 AM).

Process 12 may further include selecting 202 a first arbitrator associated with the first session. The first arbitrator may also be a participant in the first UT session. The first arbitrator may be selected based upon a variety of information. For example, an arbitrator may be selected based upon Lightweight Directory Access Protocol information (LDAP) 212. LDAP is an application protocol for accessing and maintaining directory information services. LDAP information may include organizational title or other organizational hierarchy information as well a geographical location, contact information and other directory information. LDAP may be useful in determining a first arbitrator, if for example, it is desirable that the first arbitrator hold a particular title or rank within an organization or group. Similarly, LDAP information may indicate whether a user is likely to participate in a particular electronic communication or maintain a channel for the duration of the electronic communication. For example, LDAP information may indicate that a user's location is China, which may suggest that she will either not participate in or not maintain a channel for the entire duration of a meeting scheduled a 11 AM eastern standard time. As such, that user may not represent an optimal arbitrator. As further example, LDAP information may also indicate network or geographical proximity of certain users or group affiliations, upon which selecting the first arbitrator may depend. LDAP information may also imply organizational units, location information, or organizational distance, which may indicate a suitable arbitrator for a given communication.

An arbitrator may also be selected based upon state table information 210. UT applications may be implemented in hosted applications and may include participants connecting from networks that do not provide access to LDAP information. Upon connecting to the UT server, however, participants may provide identifying information, including, for example, name, nickname company information, contact information, and a variety of other identifying characteristics. In certain implementations, this information may be derived from LDAP information, for example, if connection is implemented using an authentication service such as Security Assertion Markup Language (SAML). In other implementations, this information may be provided independent of LDAP information. This identifying information, as LDAP information (see above) may indicate whether a participant in a UT session should be selected as an arbitrator.

An arbitrator may also be selected 202 based upon network proximity information, 214. As the first arbitrator will act as a proxy, the channel of the first arbitrator will become a proxy channel for multiple other channels, transmitting data from the other channels to another location (e.g., a server, a different arbitrator, a user). As such, it may be desirable to associate the first arbitrator with users who are in close proximity with respect to their network connections and thereby decrease the electronic distance along with the concomitant use of network resources and potential for latency, quality of service or other issues. Network proximity is sometimes associated with geographical proximity, but is a distinct concept, which relates to the distance electronic signals must travel between users, including whether the users are part of the same network or sub-network. Association 116 may indicate, for example, that users 76, 78, 80 and 82 are in close network proximity to each other (e.g., they all connect through a single established network) whereas users 74 and 72 are not in close network proximity to the others (e.g., they connect through a different network). This may indicate, for example, that if a set of participants likely to participate in an electronic communication session includes or is expected to include users 76, 78, 80, and 82 the first arbitrator should be preferably chosen from the group including users 76, 78, 80 and 82.

An arbitrator may also be selected based upon intelligent mining patterns 216. As noted above, for example, a user who is not likely to remain connected for the duration of an electronic communication may not represent an ideal arbitrator. Similarly, a user who tends to use most of the bandwidth of her channel may not represent an ideal arbitrator. A participant, however, with indications of successfully past performance as an arbitrator may represent a preferred choice for an arbitrator. An intelligent mining pattern may permit analysis of these and other characteristics and actions of participants and arbitrators in order to select an appropriate first arbitrator.

An arbitrator may also be selected based upon an input from administrator 218. In certain circumstances it may be desirable for an administrator to specify a first arbitrator or set particular criteria for use in selecting a first arbitrator. For example, an administrator may desire that a particular user be selected as arbitrator based on the administrator's knowledge of that individuals conversation habits, computing practices, computing system, organizational importance, knowledge base, etc. As such, the administrator may input information relating to such knowledge, upon which the selection of the first arbitrator may be based.

An arbitrator may also be selected based upon a self-learning algorithm related to the electronic communication session 220. Implementation of process 12 using certain strategies may sometimes result in more favorable results than does implementation of process 12 using other strategies. For example, for a particular organization selecting a first arbitrator based on LDAP information may prove to be ineffective, whereas selecting a first arbitrator based on intelligent mining patterns and input from an administrator is generally successful. Or, alternatively, the most effective method of selecting a first arbitrator may depend on the particular network configuration implicated by process 12 as well as the type of electronic communication session occurring (e.g., a video-conference board meeting, a voice-only team meeting, a voice- and text-enabled web conference).

This variation may occur, for example, because certain network configurations may be particularly conducive to wide choice of arbitrators (e.g., configurations with many dedicated hard-line connections) or because in certain types of electronic communication band-width requirements of various channels are likely to be high (or low) or multiple participants are likely to be talking (or otherwise participating) simultaneously. A self-learning algorithm may elucidate these or other patterns in order to help select the most appropriate arbitrator or arbitrators for a given electronic communication. A self-learning algorithm may be implemented at pre-determined intervals or in response to an occurrence (e.g., detection of a system configuration or system configuration change) and may be implemented, for example, automatically or in response to an input.

An arbitrator may also be selected based upon an order of connection related to the electronic communication session 222. In a given electronic communication, all participants may not connect to the session immediately at the commencement of the session. The order in which participants connect to and disconnect from a session is referred to herein as the order of connection for that session. In order to facilitate the use of a proxy channel throughout the entirety, it may be desirable to select an arbitrator based upon an order of connection. For example, a participant connecting before the session begins may be preferably selected as an arbitrator whereas a participant connecting ten minutes after the session begins may be preferably not selected as an arbitrator.

An arbitrator may also be selected based upon an unavailability of a second arbitrator 224. In certain circumstances it may be desirable to select a particular arbitrator X for a particular type of electronic communication session. In certain circumstances, however, arbitrator X may be unavailable. For example, this may occur in the case that arbitrator X has already been assigned as a proxy and cannot support additional proxy connections or in the case that arbitrator X has been unexpectedly disconnected from a session or affected with unexpected quality of service issues. As such, it may be desirable to select a different arbitrator, based upon the unavailability of arbitrator X.

An arbitrator may also be selected based upon a connection strength or a quality of service 226. Because the arbitrator may be caused to act as a proxy for other participants in an electronic communication session, it may be desirable to select an arbitrator based on the connection strength or quality of service of the arbitrator's connection. For example if connection 106 of user 84 is a low-bandwidth mobile connection, connection 108 of user 86 is a hard-line connection characterized by known quality of service issues and connection 110 of user 88 is a hard-line connection characterized by high quality of service, process 12 may preferably select user 88 as a first arbitrator.

An arbitrator may also be selected based upon an overloading of a second channel. For example, Process 12 may operate to associate participants not yet assigned to a proxy connection (e.g., users just entering an established electronic communication session) with an arbitrator. In a certain instance, however, a preferred arbitrator (e.g., one designated by an administrator) may be already acting as a proxy. If the proxy channel employed by the arbitrator is near or at an overloaded condition, the arbitrator may no longer be considered a preferred arbitrator for the session and a different first arbitrator may be chosen. It will be understood that this and other aspects of selecting a first arbitrator may be applied also to selecting a second arbitrator or a set of multiple arbitrators.

Process 12 may also include selecting 204 a first set of participants in an electronic communication session. In order to cause an arbitrator to act as proxy, it is necessary to select a set of participants whose connections to the server may be replaced with connections to the arbitrator. The first set of participants may include one or more arbitrators as well as users not selected as arbitrators and users not eligible to be selected as arbitrators. It will be understood that the first set of participants may include a single participant or multiple participants. Members of the first set of participants may employ one or more channels in order to connect to the UT session. These channels are said to be associated with the first set of participants. Process 12 may further include selecting a first channel associated with the first set of participants, to be assigned to a proxy connection.

A set of participants may be selected based upon a variety of information. For example, the first set of participants may be selected based upon LDAP information 212. LDAP information may be useful in determining the first set of participants, if for example, it is desirable that a participant of particular organizational rank be assigned to a particularly reliable arbitrator, or it may be desirable that members of a team are assigned to a single arbitrator or distributed among multiple arbitrators. Similarly, LDP information may indicate whether a user is likely to participate in a particular electronic communication session (and how frequently) or to maintain a connection for the duration of the electronic communication. For example, LDAP information may indicate that a user's location is China, which may suggest that she will either not participate in or not maintain a channel for the entire duration of a meeting scheduled a 11 AM eastern standard time. As such, that user may be grouped with similar other individuals for assignment to a proxy. As another, example, LDAP information may indicate that certain users are managers, team leaders or executives and therefore are likely to be connected for the entire duration of an electronic communication session and may participate frequently or in data-intensive ways in the session. In one embodiment, only one user of this type may be chosen for the a given set of participants. (It will be understood that this, other discussion herein relating to selecting a set of participants, may also apply to selecting a first channel to be assigned to a proxy connection.)

A set of participants may also be selected based upon state table information 210. UT applications may be implemented in hosted applications and may include participants connecting from networks that do not provide access to LDAP information. Upon connecting to the UT server, however, participants may provide identifying information, including, for example, name, nickname company information, contact information, and a variety of other identifying characteristics. In certain implementations, this information may be derived from LDAP information, for example, if connection is implemented using an authentication service such as Security Assertion Markup Language (SAML). In other implementations, this information may be provided independent of LDAP information. This identifying information, as LDAP information (see above) may indicate whether a participant in a UT session should be selected as a member of the first set of participants.

A set of participants may also be selected based upon network proximity information, 214. As indicated by association 116, for example, users 76, 78, 80 and 82 may be in close network proximity to each other (e.g., they all connect through a single established network). This may indicate that users 78, 80 and 82 may be assigned to a set of participants associated with user 76 when user 76 acts as arbitrator.

A set of participants may also be selected based upon intelligent mining patterns, 216, which may permit analysis of past performance and behavior in order to optimize process 12. For example, intelligent mining patterns may indicate that certain users tend to consume small amounts of bandwidth in electronic communication sessions representing a particular session type, e.g., voice-only team meetings. In like sessions, therefore, these users may be selected as a first set of participants to be associated with, for example, an arbitrator with limited bandwidth.

A set of participants may also be selected based upon an input from a first administrator, 218. An administrator may, for example, desire that specific users (e.g., team members collaborating on a report) share a proxy connection or that specific users (e.g., the two main presenters at a electronic communication session) not share a proxy connection (e.g., because serving as arbitrators). As such, process 12 may receive input from an administrator relating to the selection of a set of participants to be assigned to a proxy.

A set of participants may also be selected based upon a self-learning algorithm related to the electronic communication session 220. Implementation of process 12 using certain strategies may result in more favorable results than implementation of process 12 using other strategies. For example, for a particular organization selecting a first set of participants based on LDAP information may prove to be ineffective, whereas selecting a first set of participants based on intelligent mining patterns and input from an administrator may be generally successful. Or, alternatively, the most effective method of selecting a first set of participants may prove to depend on the particular network configuration implicated by process 12 as well as the type of electronic communication (e.g., a video-conference board meeting, a voice-only team meeting, a voice- and text-enabled web conference). This may occur because certain network configurations may be particularly conducive to wide choice of arbitrators (e.g., configurations with many dedicated hard-line connections) or because in certain types of electronic communication sessions band-width requirements of various channels are likely to be high (or low) or multiple participants are likely to be talking (or otherwise participating) simultaneously. A self-learning algorithm may elucidate these or other patterns in order to help select the most appropriate arbitrator or arbitrators for a given electronic communication. Such a self-learning algorithm may be implemented at pre-determined intervals or in response to an occurrence (e.g., detection of a system configuration or system configuration change).

A set of participants may also be selected based upon an order of connection related to the electronic communication session 222. It may be desirable to select a first set of participants based upon an order of connection. For example, the first ten participants connecting to a session begins may be preferably selected as a first set of participants.

A set of participants may also be selected based upon an unavailability of a second arbitrator 224. This may occur, for example, if certain participants had been assigned to a second arbitrator, but the second arbitrator is no longer available to act as a proxy (e.g., has disconnected from the session or has experience quality of service, connection strength, or other issues). The need for a different arbitrator to act as proxy may result in these participants being assigned to the first set of participants.

A set of participants may also be selected based upon a connection strength or a quality of service 226. If a participant requires particularly high quality of service or connection strength (as may be determined directly or from parameters including LDAP information, intelligent mining patterns or self-learning algorithms) that participant may be selected for the first set of participants, especially if the first arbitrator can provide high quality of service or connection strength. Alternatively, if a participant does not require particularly high quality of service or connection strength (e.g., as determined from LDAP information, intelligent mining patterns or self-learning algorithms) that participant may be selected for the first set of participants, especially if the first arbitrator can not provide high quality of service or connection strength.

A set of participants may also be selected based upon an overloading of a channel 228. Referring now to FIG. 4, for example, channel 100, which is a proxy channel may become overloaded and therefore no longer able to transmit necessary session information. A new arbitrator may be selected to act as a proxy. The overloaded condition of channel 100, in this example, may indicate that participants currently (or formerly) associated with that channel should be selected for the set of participants from which those assigned to the new proxy will be selected. As such, it may be desirable to select for a set of participants to be assigned to the new proxy, certain of users 82, 80, 76, 74, and 72, who are all connected through overloaded proxy connection 100.

Selecting the first arbitrator or, a first set of participants, or the channel to be served by a proxy connection may occur prior to the start of the electronic communication session or may occur during the electronic communication session, for example, in near real-time in response to an input or other event. It may be desirable to select the current set of arbitrators, the first arbitrator or the first set of participants before the commencement of an electronic communication so that all necessary connections can be established at that time. However, it may sometimes be desirable or necessary to select the current set of arbitrators, the first arbitrator or the first set of participants after the commencement of the electronic communication session, often in near real-time. This may occur, for example, if a UT server unexpectedly approaches (or reaches) a saturation condition, or if the various parameters discussed herein change during the electronic communication session. For example, a channel previously assigned as a proxy channel may become overloaded, a previously assigned arbitrator may become unavailable, a connection strength or quality of service may change, the system configuration may change, or users may join or leave the session. Similarly, this need for near real-time selection may occur if the server was experiencing no capacity issues at the commencement of the session, but during the session experiences or is anticipated to experience capacity issues which may necessitate assignment of proxy connections. If selection and organization of new proxy connections does not occur quickly, the affected electronic communication session may experience unexpected termination of open channels or other issues.

Process 12 may further include directing 206 the first arbitrator to act as a proxy connection for a channel associated with at least one member of the first set of participants. An arbitrator may act as a proxy connection for a channel when that channel (e.g., channel 102) is directed to the arbitrator (e.g., user 78) rather than to the server (e.g., server 120). Accordingly, information that would have transmitted from user 80 to server 120 through channel 102 now transmits to user 78 through channel 102' and then is transmitted, as necessary, to server 120 through proxy connection 100. Acting as a proxy connection may also include negotiating (i.e., requesting, sending, receiving or receiving requests related to) information relating to the UT session (e.g., information relating to the characteristics of a channel or of a participant, such as participant IP address, or other parameters of an electronic communication session) directly with a member of the first set of participants. In certain configurations, arbitrators acting as proxy connections may send and receive information to and from a central server, for example, server 120. In other configurations, however, arbitrators acting as proxy connections may send or receive session information directly to or from participants. This may occur, for example, through peer-to-peer transmission of information with one or more members of the first set of participants. For example, referring to FIGS. 4 and 5, user 78, acting as a proxy connection, may receive session information relating to user 80 directly from user 80 through connection 102', rather than from server 120 through connection 102.

Referring again to FIG. 3, process 12 may further include determining 238 a success metric associated with first strategy 236, wherein the first strategy is associated with at least one of selecting 200 the first session, selecting 202 the first arbitrator, selecting 204 the first set of participants, and directing 206 the first arbitrator to act as a proxy connection. For example, a particular implementation of process 12 may include directing certain types of participants to act as proxy connections for certain sets of other participants and may further include selecting a particular UT session for use in process 12 based on, for example, assessment of session importance. The various parameters influencing the selections and directions of process 12 (e.g., session importance or the characteristics of the type of participant selected as arbitrator) and the specific implementation of process 12 that results may be referred to, collectively or individually, as a strategy (e.g., first strategy 236).

Implementation of a particular strategy for process 12 may permit determining a success metric. For example, if it is determined, based on one or more of various indicators (e.g., indications of customer satisfaction or dissatisfaction, quality of service metrics, number of lost connections, number of service interruptions or slow-downs, etc.) that such implementation of process 12 (i.e., such strategy) was successful, the successful strategy may be assigned a high score within a particular success metric.

A later implementation of process 12 may then refer to this success metric in order to determine a second strategy. For example, if a prior implementation of process 12 resulted in a high score within a success metric, the strategy that resulted in that high score may be duplicated or emulated in various ways in a later implementation of process 12, especially if the later implementation relates to a configuration, UT session, or set of UT sessions that are similar to those of the earlier implementation. In other words, the second strategy may be determined so as to duplicate or emulate a first strategy based upon a high score within the success metric in order to achieve similar success in similar circumstances. (Alternatively, a second strategy may vary considerably in whole or in part from a first strategy resulting in a low score within the success metric, in order to achieve greater success in similar circumstances.) The second strategy may then be implemented in order to select 242 a second unified telephony session, select 244 a second arbitrator, select 246 a second set of participants, and direct 258 the second arbitrator to act as a proxy connection. It will be understood that this process may be iterative and that multiple strategies may be associated with any given success metric. It will be further understood that this aspect of process 12 may be implemented, for example, across numerous UT sessions or may be implemented, as a further example, within a single UT session in order to optimize the proxy connection configuration of that single session.

Figure 6:
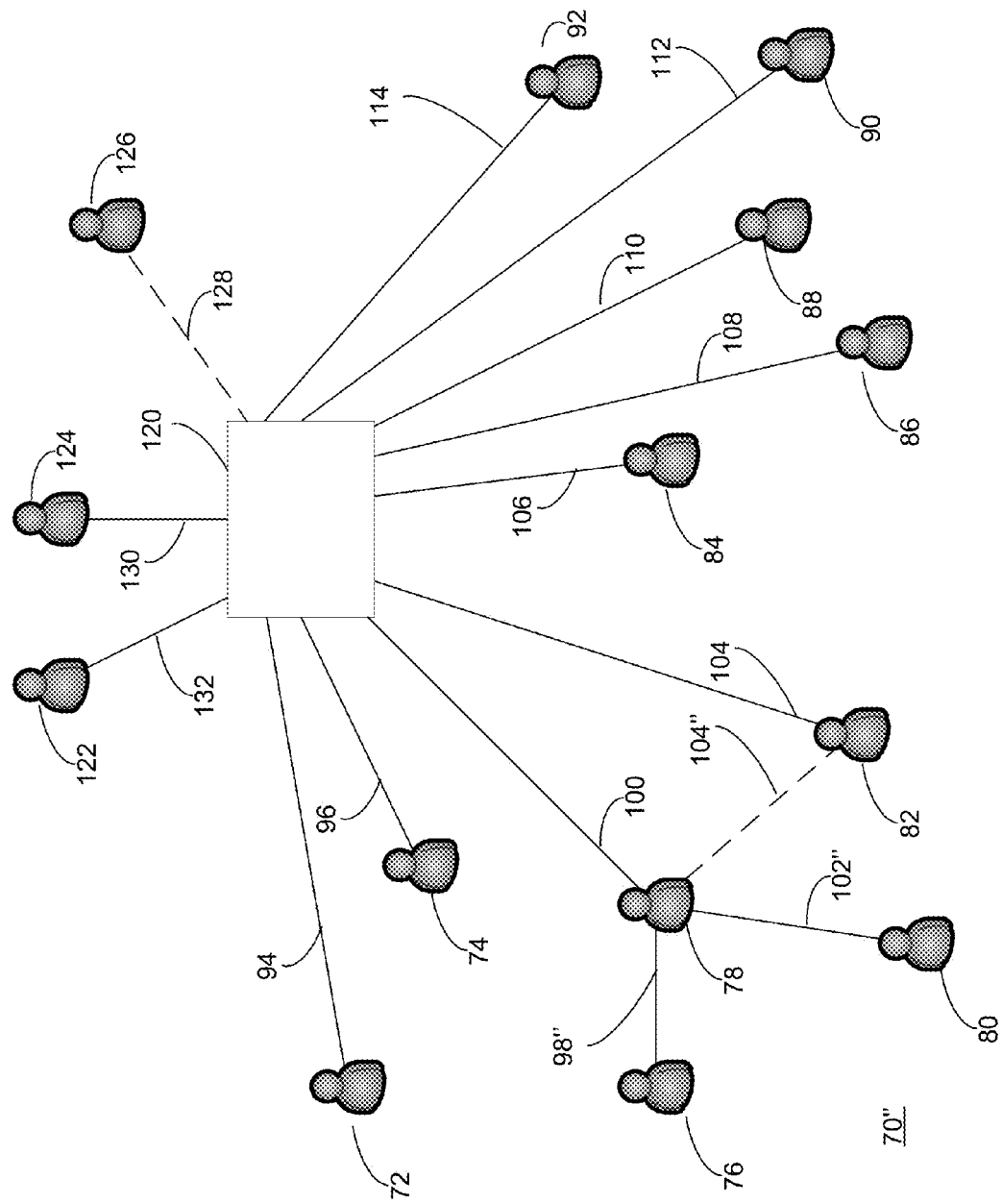
FIG. 6 is a third diagrammatic view of an implementation of a proxy assignment process Like reference symbols in the various drawings indicate like elements

Because the use of proxy connections may result in session quality issues, it may be desirable to implement process 12 only as needed for a given UT server or set of UT sessions. For example, referring now to FIG. 6, it can be seen that various user have established connections with server 120. Of these individuals, users 84, 86 and 88 may be participants in a first UT session. Users 90 and 92 may be participants in a second UT session. Users 122, 124 and 72 may be participants in a third UT session. Finally, users 74, 76, 78, 80 and 82 may be participants in a fourth UT session. It can be seen in FIG. 6 that process 12 has already been applied to the fourth UT session, with user 78 acting as an arbitrator for the fourth UT session, and accordingly being connected via proxy channels 102" and 98" to users 80 and 76, respectively. In the situation as currently described, the load on server 120 may be acceptable, i.e., may not trigger (or approach) a saturation condition. For example, however, if user 126 joins as a participant in the second UT session, via connection 128, this may result in triggering (or approaching) of a saturation condition for server 120. In response to this, process 12 may selectively result in assignment of user 82 to arbitrator 78, such that user 82 connects to the fourth UT session via proxy connection 104" rather than connection 104. If this adjustment is sufficient to mitigate the saturation condition (or potential saturation condition) described, this may indicate that further implementation of process 12 is currently unnecessary (i.e., that additional participants need not be assigned to proxy connections). Further, in the event the load on server 120 decreases to an acceptable level, users currently employing a proxy connection may be reassigned to a standard connection. For example, if user 126 subsequently disconnects from the second UT session, this may permit reassignment of user 82 from proxy connection 104" to standard connection 104.

In order to manage participant transitions to and from proxy connections (as well as other aspects of a UT session), server 120 may maintain a state table related to one or more participants in various UT sessions. For example, in an electronic communication session, it may be necessary to determine the current or near-current state information of participants in the session. State information may accordingly include, for example, whether or not a participant is connected to the session, how long the connection has lasted, the type of connection, various directory or other identifying information, whether a participant is connected through a proxy connection and, if so, which arbitrator is acting as a proxy connection for that participant.

Managing a state table may include maintaining current or near-current state information. In this way, for example, it may be possible to not only to optimize selection of arbitrators and participants, but also to determine whether remedial action may be necessary after occurrence of an event related to an electronic communication session and what that remedial action may be. Referring again to FIG. 5, if user 88 is acting as an arbitrator and proxy connection, for example, and user 88 disconnects from the session, remedial action may be necessary or the connections of users 84, 86, 90, and 92, who have connected to server 120 through the proxy connection 110, may also be lost. Through reference to a current state table, however, it may be determined that users 84, 86, 90, and 92 were still connected to the session when user 88 disconnected, and that user 88 was a proxy for users 84, 86, 90, and 92. It may therefore be determined that either new connections to server 120 from users 84, 86, 90, and 92 must be established or a new proxy connection for one or more of users 84, 86, 90, and 92 must be selected. Similarly, referring again to FIG. 6, user 126 may disconnect from a UT session with the result that server 120 no longer meets (or approaches) a saturation condition. As such, through reference to the state table, it may be possible to determine which other users are employing proxy connections and accordingly reassign some or all of those users to direct connections with server 120.

It will be appreciated that each of the factors discussed above relating to selecting an arbitrator, set of participants or a channel can be implemented alone or in conjunction with other factors. Further, each of the factors discussed above can be implemented at pre-determined intervals or in response to detection of a system configuration (e.g., an over-capacity condition or expected over-capacity condition, the connection of new users or devices to a session or network, or disconnection of users or devices from a session or network).

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer readable storage medium having a plurality of instructions stored thereon, which, when executed by a processor, cause the processor to perform operations comprising:
   selecting a first unified telephony session;
   selecting a first arbitrator associated with the first unified telephony session;
   selecting a first set of participants associated with the first unified telephony session; and
   directing the first arbitrator to act as a proxy connection for a first channel associated with the first set of participants;
   wherein selecting at least one of the first arbitrator, the first set of participants and the first channel is based upon, at least in part, a self-learning algorithm related to the first unified telephony session.

2. The computer program product of claim 1 wherein the plurality of instructions, when executed by the processor, cause the processor to perform operations further comprising:
   selecting the first unified telephony session based upon, at least in part, a session importance.

3. The computer program product of claim 1 wherein the plurality of instructions, when executed by the processor, cause the processor to perform operations further comprising:
   selecting at least one of the first arbitrator, the first set of participants and the first channel based upon, at least in part, at least one of:
   Lightweight Directory Access Protocol information,
   state table information,
   network proximity information,
   intelligent mining patterns,
   an input from an administrator, an order of connection related to the first unified telephony session, an unavailability of a second arbitrator, a connection strength or a quality of service, and an overloading of a second channel.

4. The computer program product of claim 1 wherein acting as a proxy connection includes negotiating information relating to the first unified telephony session directly with a member of the first set of participants.

5. The computer program product of claim 1 wherein the plurality of instructions, when executed by the processor, cause the processor to perform operations further comprising:

determining a success metric associated with a first strategy, wherein the first strategy is associated with at least one of selecting the first unified telephony session, selecting the first arbitrator, selecting the first set of participants, and directing the first arbitrator to act as a proxy connection;

determining a second strategy based upon, at least in part, the success metric associated with the first strategy;

selecting a second unified telephony session associated with a second unified telephony server;

selecting a second arbitrator associated with the second session;

selecting a second set of participants associated with the second session; and directing the second arbitrator to act as a proxy connection for a second channel associated with the second set of participants;

wherein at least one of selecting a second session, selecting a second arbitrator, selecting a second set of participants, and directing the second arbitrator to act as a proxy connection is based upon, at least in part, a second strategy.

6. The computer program product of claim 1 wherein selecting the first arbitrator and the first set of participants occurs prior to the start of the unified telephony session.

7. The computer program product of claim 1 wherein selecting at least one of the first arbitrator and the first set of participants occurs during an electronic communication session in real-time.

8. The computer program product of claim 1 wherein the self-learning algorithm is implemented based upon, at least in part, detection of a system configuration.

9. A computer system comprising:

at least one processor;

at least one memory architecture coupled with the at least one processor, wherein the at least one processor is configured to:

select a first unified telephony session;

select a first arbitrator associated with the first unified telephony session;

select a first set of participants associated with the first unified telephony session; and direct the first arbitrator to act as a proxy connection for a first channel associated with the first set of participants;

wherein selecting at least one of the first arbitrator, the first set of participants and the first channel is based upon, at least in part, a self-learning algorithm related to the first unified telephony session.

10. The computer system of claim 9 wherein the at least one processor is further configured to:

select the first unified telephony session based upon, at least in part, a session importance.

11. The computer system of claim 9 wherein the at least one processor is further configured to:

select at least one of the first arbitrator, the first set of participants and the first channel based upon, at least in part, at least one of:

Lightweight Directory Access Protocol information, state table information, network proximity information, intelligent mining patterns, an input from an administrator, an order of connection related to the first unified telephony session, an unavailability of a second arbitrator, a connection strength or a quality of service, and an overloading of a channel.

12. The computer system of claim 9 wherein acting as a proxy connection includes negotiating session information relating to the first unified telephony session directly with a member of the first set of participants.

13. The computer system of claim 9 wherein the at least one processor is further configured to:

determine a success metric associated with a first strategy, wherein the first strategy is associated with at least one of selecting the first unified telephony session, selecting the first arbitrator, selecting the first set of participants, and directing the first arbitrator to act as a proxy connection;

determine a second strategy based upon, at least in part, the success metric associated with the first strategy;

select a second unified telephony session;

select a second arbitrator associated with the second session;

select a second set of participants associated with the second session; and direct the second arbitrator to act as a proxy connection for a second channel associated with the second set of participants;

wherein at least one of selecting a second session, selecting a second arbitrator, selecting a second set of participants, and causing the second arbitrator to act as a proxy connection is based upon, at least in part, the second strategy.

14. The computer system of claim 9 wherein selecting the first arbitrator and the first set of participants occurs during the first unified telephony session in real-time.

15. The computer system of claim 9 wherein the self-learning algorithm is implemented based upon, at least in part, detection of a system configuration.

* * * * *